(12) United States Patent
Mattei et al.

(10) Patent No.: US 10,113,466 B2
(45) Date of Patent: Oct. 30, 2018

(54) SYSTEM FOR TREATING THE EXHAUST GASES FOR A VEHICLE EQUIPPED WITH INTERNAL COMBUSTION ENGINE

(71) Applicant: SDF S.p.A., Treviglio (IT)

(72) Inventors: Manlio Mattei, Treviglio (IT); Luca Crippa, Treviglio (IT); Antonio Diego Mazzotti, Urago d'Oglio (IT)

(73) Assignee: SDF S.p.A., Treviglio (IT)

( * ) Notice: Subject to any disclaimer, the term of this patent is extended or adjusted under 35 U.S.C. 154(b) by 79 days.

(21) Appl. No.: 15/310,088

(22) PCT Filed: May 18, 2015

(86) PCT No.: PCT/IB2015/053640
§ 371 (c)(1),
(2) Date: Nov. 9, 2016

(87) PCT Pub. No.: WO2015/177704
PCT Pub. Date: Nov. 26, 2015

(65) Prior Publication Data
US 2017/0138240 A1    May 18, 2017

(30) Foreign Application Priority Data

May 19, 2014  (IT) .............................. MI2014A0907

(51) Int. Cl.
*F01N 3/28*      (2006.01)
*F01N 3/021*     (2006.01)
(Continued)

(52) U.S. Cl.
CPC ....... *F01N 3/2839* (2013.01); *B01D 46/0005* (2013.01); *B01D 46/0027* (2013.01);
(Continued)

(58) Field of Classification Search
CPC ........ F01N 3/2839; F01N 3/021; F01N 3/035; F01N 13/14; B01D 46/0005; B01D 46/0027; B01D 53/944
See application file for complete search history.

(56) References Cited

U.S. PATENT DOCUMENTS 6,106,344 A    8/2000  Mashiko
6,824,743 B1 * 11/2004  Pawson .................. F01N 3/021
                                              422/168
(Continued)

OTHER PUBLICATIONS

European Patent Office, International Search Report, dated Aug. 11, 2015.
(Continued)

*Primary Examiner* — Patrick Maines
(74) *Attorney, Agent, or Firm* — Ice Miller LLP

(57) ABSTRACT

The invention describes an internal combustion engine (14) for a vehicle (12) that comprises a fly-wheel (24) placed at the rear part with respect to the internal combustion engine (14), a cooling system (28) placed at the front part with respect to the internal combustion engine, a forced induction group consisting of a turbine (22), placed on the same side as the fly-wheel (24), and a compressor (30), placed on the same side as the cooling system (28), and a system (10) for treating the exhaust gases provided with a conduit for the inlet of exhaust gases, operatively connected to the exit door of the turbine, a conduit for the outlet of exhaust gases and a main body or shell (38) internally hollow for containing a substrate (44) through which the exhaust gases are conveyed so that they are subject to predefined chemical reactions. The system for treating exhaust gases is placed on the head of the internal combustion engine, the main body or shell has a cross-sectional shape, with respect to the driving direction of the vehicle, of an ellipsoid the larger axis of which is oriented according to a substantially horizontal direction and (Continued)

the smaller axis of which is oriented according to a substantially vertical direction, so that the main body or shell has a widened and compressed shape that allows it to occupy the least height-wise possible space with respect to the head of the internal combustion engine, and the conduit for the inlet of exhaust gases and the conduit for the outlet of exhaust gases are placed in fluid communication with a same transverse side wall (46), with respect to the driving direction of the vehicle, of the main body or shell.

11 Claims, 6 Drawing Sheets

(51) Int. Cl.
  *F01N 3/035* (2006.01)
  *F02B 37/00* (2006.01)
  *F01N 13/00* (2010.01)
  *F01N 13/14* (2010.01)
  *F01N 13/18* (2010.01)
  *F01P 3/18* (2006.01)
  *B01D 46/00* (2006.01)
  *B01D 53/94* (2006.01)
  *F01N 3/10* (2006.01)

(52) U.S. Cl.
  CPC ........... *B01D 53/944* (2013.01); *F01N 3/021* (2013.01); *F01N 3/0211* (2013.01); *F01N 3/035* (2013.01); *F01N 3/103* (2013.01); *F01N 3/2892* (2013.01); *F01N 13/002* (2013.01); *F01N 13/14* (2013.01); *F01N 13/1805* (2013.01); *F01P 3/18* (2013.01); *F02B 37/00* (2013.01); *B01D 2279/30* (2013.01); *F01N 2340/04* (2013.01); *F01N 2590/08* (2013.01)

(56) References Cited

U.S. PATENT DOCUMENTS

| | | | | |
|---|---|---|---|---|
| 2002/0106312 | A1* | 8/2002 | Harris | B01D 53/9454 422/168 |
| 2010/0095660 | A1* | 4/2010 | Oliver | F01N 13/1805 60/324 |
| 2010/0212301 | A1* | 8/2010 | De Rudder | F01N 3/2066 60/299 |
| 2013/0086894 | A1* | 4/2013 | Wikaryasz | F01N 13/141 60/282 |
| 2013/0152557 | A1* | 6/2013 | Brugger | F01N 3/035 60/295 |
| 2014/0311137 | A1* | 10/2014 | Wikaryasz | F01N 3/2066 60/324 |
| 2015/0217230 | A1* | 8/2015 | Reichert | F01N 3/2066 423/212 |

OTHER PUBLICATIONS

European Patent Office, Written Opinion of the International Searching Authority, dated Aug. 11, 2015.

* cited by examiner

SYSTEM FOR TREATING THE EXHAUST GASES FOR A VEHICLE EQUIPPED WITH INTERNAL COMBUSTION ENGINE

CROSS-REFERENCE TO RELATED APPLICATIONS

The present application is a U.S. national stage of, and claims the priority benefit of, International Patent Application Serial No. PCT/IB2015/053640, filed May 18, 2015 and Italian Patent Application Serial No. MI2014A000907 filed May 19, 2014, the text and drawings of which are hereby incorporated by reference in their entireties.

The present invention refers to a system for treating exhaust gases for a vehicle equipped with internal combustion engine, in particular but not exclusively a farming or industrial tractor equipped with a forced induction diesel cycle engine.

Similarly to automobiles and trucks, also in farming and industrial tractors it is known to use systems for treating exhaust gases of the DOC ("Diesel Oxidation Catalyst"), DOC+POC ("Particulate Oxidation Catalyst") or DPF ("Diesel Particulate Filter") type. In particular, in farming and industrial tractors the system for treating the exhaust gases is usually mounted at the engine, typically under the hood over such an engine. For example, some systems for treating exhaust gases for farming and industrial tractors of the known type are described in documents EP-A-1947305, EP-A-2379856, EP-A-2379857, EP-A-2440758 and GB-A-2465151. Other known systems for treating exhaust gases, not necessarily used on farming and industrial tractors, on the other hand, are described in documents JP-A-2012072722, U.S. Pat. No. 6,106,344, JP-A-2012219624, U.S. Pat. No. 6,651,773 and DE-A-19955013.

A drawback of current systems for treating exhaust gases for farming and industrial tractors is due to their size. This sometimes means that the hood and/or other parts of the bodywork of the vehicle have to be changed in order to be able to correctly house both the system for treating exhaust gases, and the relative connection conduits with the engine.

The purpose of the present invention is therefore to provide a system for treating exhaust gases for a vehicle equipped with internal combustion engine, in particular but not exclusively a farming or industrial tractor equipped with a forced induction diesel cycle engine, which is able to overcome the aforementioned drawbacks of the prior art in an extremely simple, cost-effective and particularly functional manner.

In detail, a purpose of the present invention is to provide a system for treating the exhaust gases for a vehicle equipped with internal combustion engine that is of a particularly small size, so as to be able to be easily installed in the engine compartment of the vehicle without the need to make any modifications. The system for treating the exhaust gases according to the present invention comprises both a device actually intended for treating exhaust gases, configured to reduce the polluting emissions below the limits prescribed by the current technical legislation, and the suitable means for connecting the device itself with the engine on one side and with the silencer, or with a further device for treating the exhaust gases, on the other side. These devices can consist of DOC or DOC+POC type catalysts, or of DPF type filters.

The system for treating the exhaust gases according to the present invention is designed to be arranged under the hood of the vehicle, above the engine. The system is fed by the exhaust gases coming out from the turbine of the engine, which is indeed of the forced induction type. These gases go through the system and, thereafter, are conveyed outside of the vehicle through a suitable exhaust piping.

The system is applicable in particular to those engine configurations in which the outlet of the turbine is on the fly-wheel side. The system has a compact, oval shape, such as to occupy the least height-wise space possible and ensure the use of the existing hoods. The system also has the purpose of reducing to the minimum the length of the conduits for connecting between the filter and the air radiator with the compressor, as well as of the connection conduits downstream of the turbine. This arrangement finally achieves the purpose of improving the distribution of the thermal loads in the area beneath the hood of the vehicle.

These purposes according to the present invention are accomplished by making a system for treating the exhaust gases for a vehicle with internal combustion engine, in particular but not exclusively a farming or industrial tractor equipped with a diesel cycle engine, as outlined in claim 1.

Further characteristics of the invention are highlighted by the dependent claims, which are an integral part of the present description.

The characteristics and advantages of a system for treating exhaust gases for a vehicle equipped with internal combustion engine according to the present invention will become clearer from the following description, given as an example and not for limiting purposes, referring to the attached schematic drawings, in which.

Figure 5:
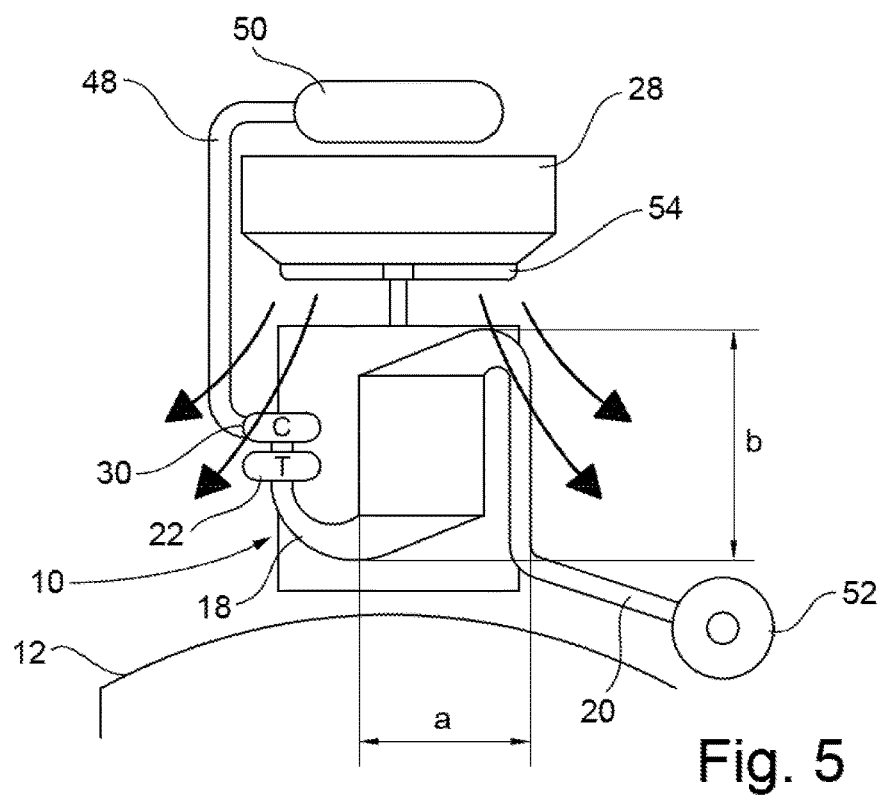
Figure 6:
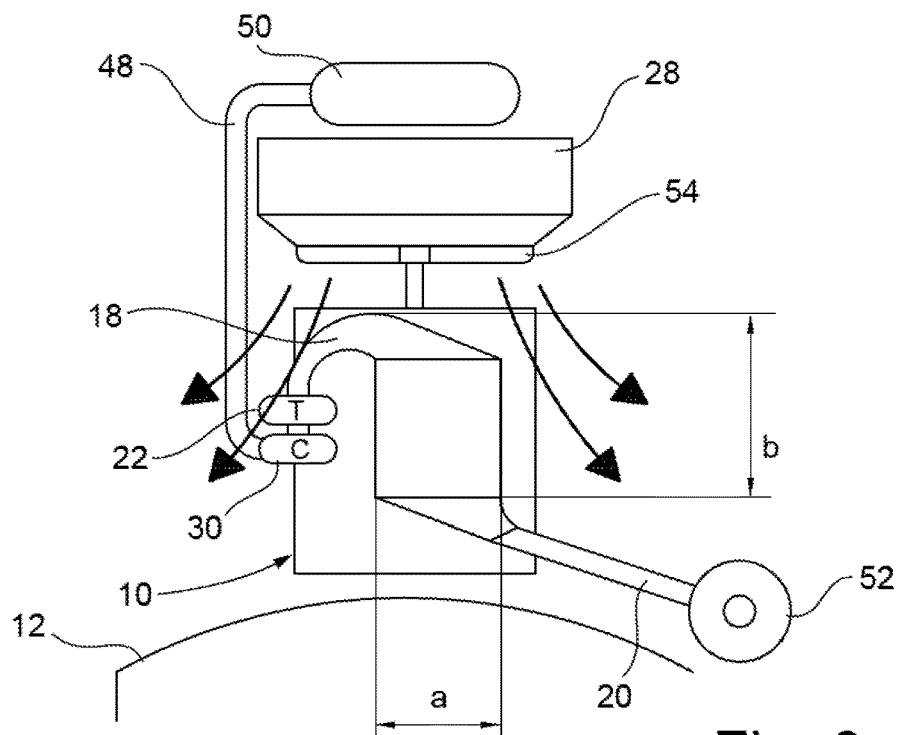
Figure 7:
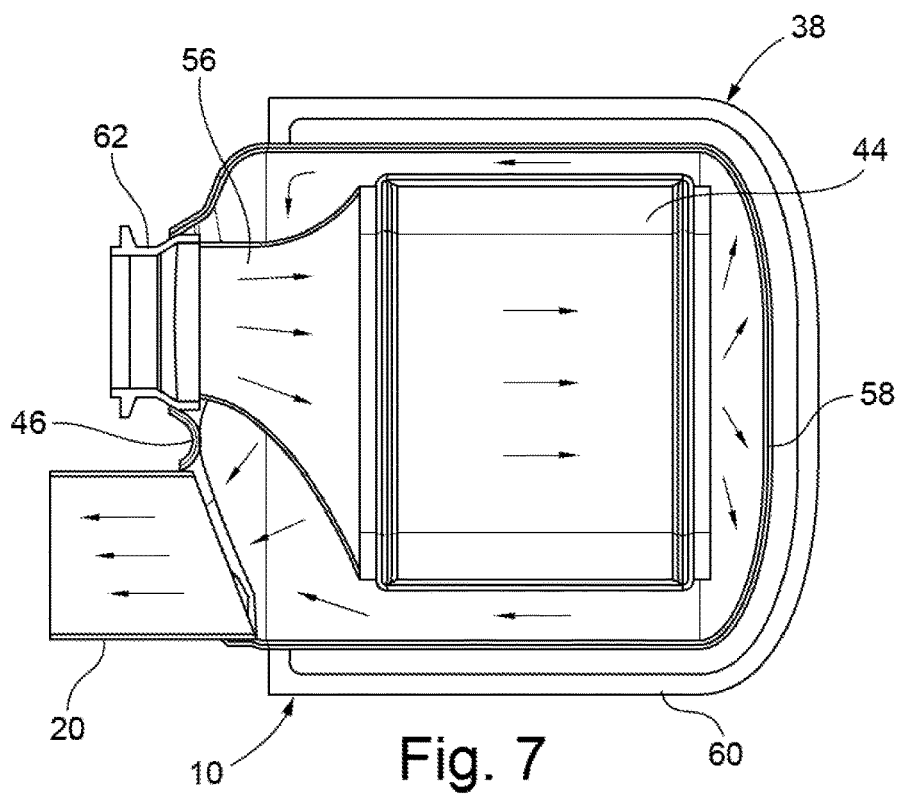
Figure 8:
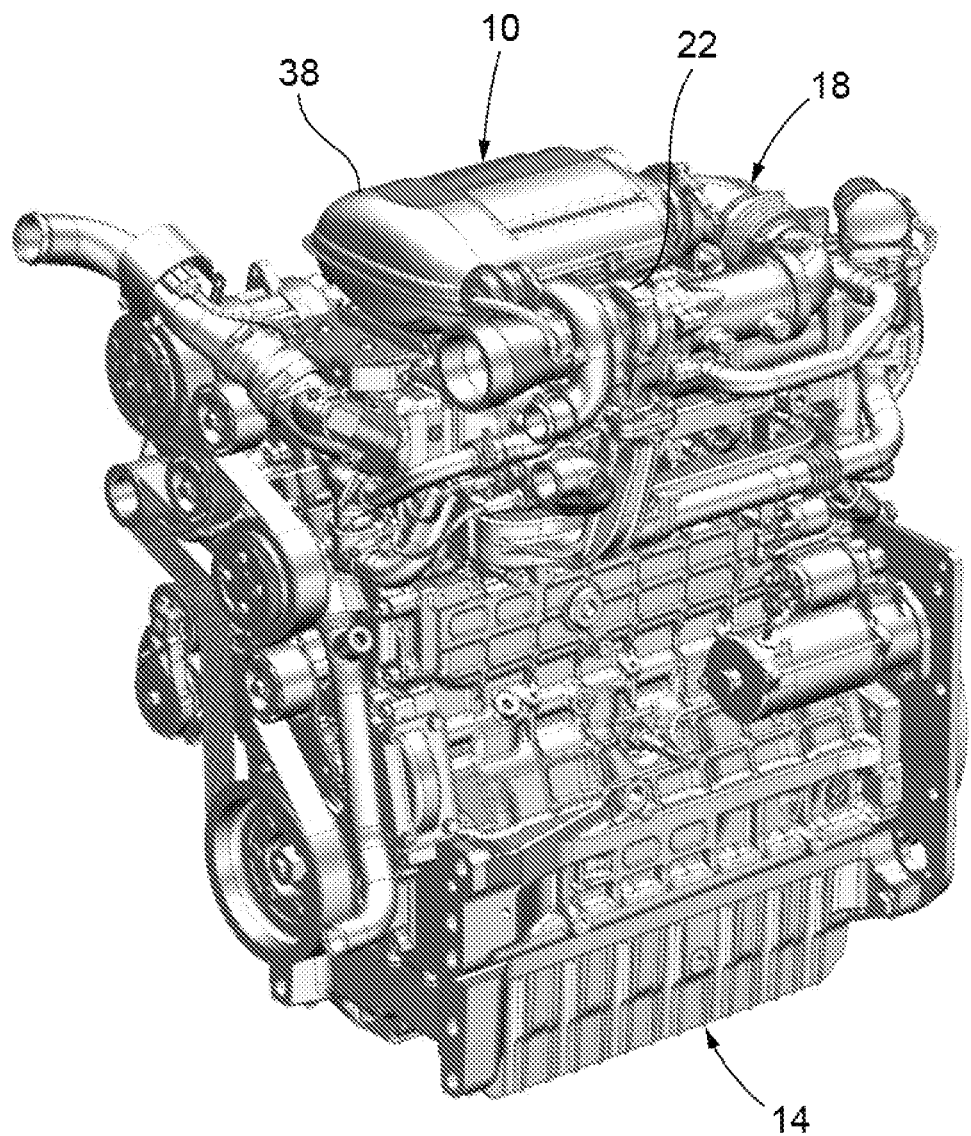
Figure 9:
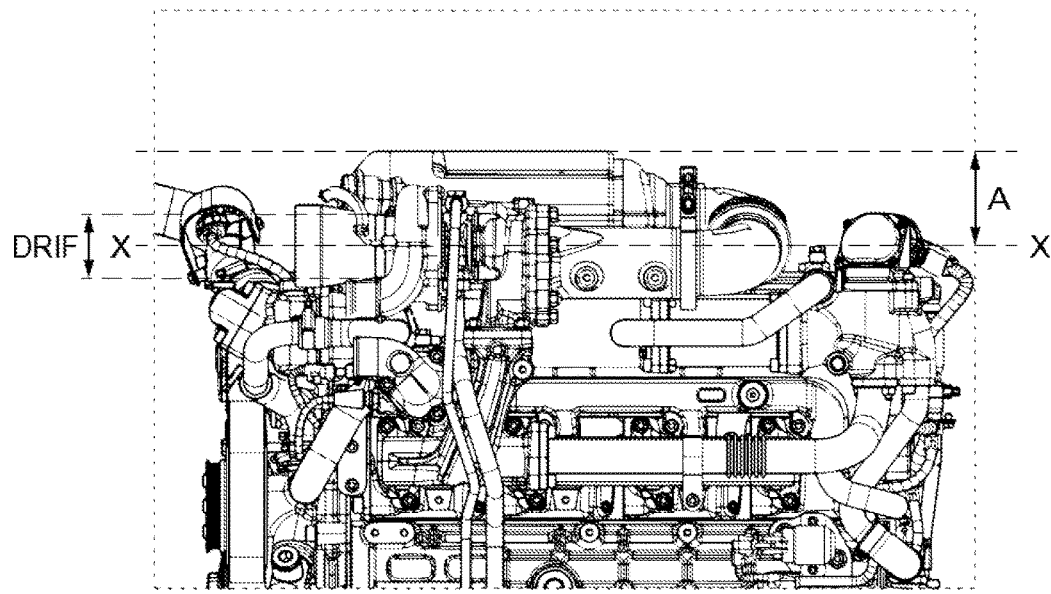

FIGS. 5 and 6 respectively show the layouts of two systems for treating exhaust gases for farming and industrial tractors according to the prior art;

FIG. 7 is a section view of the system for treating exhaust gases according to the present invention, in which the direction of flow of the exhaust gases is highlighted;

FIG. 8 shows an internal combustion engine, in particular a diesel cycle engine, provided with a forced induction group with turbocompressor, on which a system for treating exhaust gases according to the present invention is installed;

FIG. 9 is a partial side view of the internal combustion engine of FIG. 8; and

Figure 10:
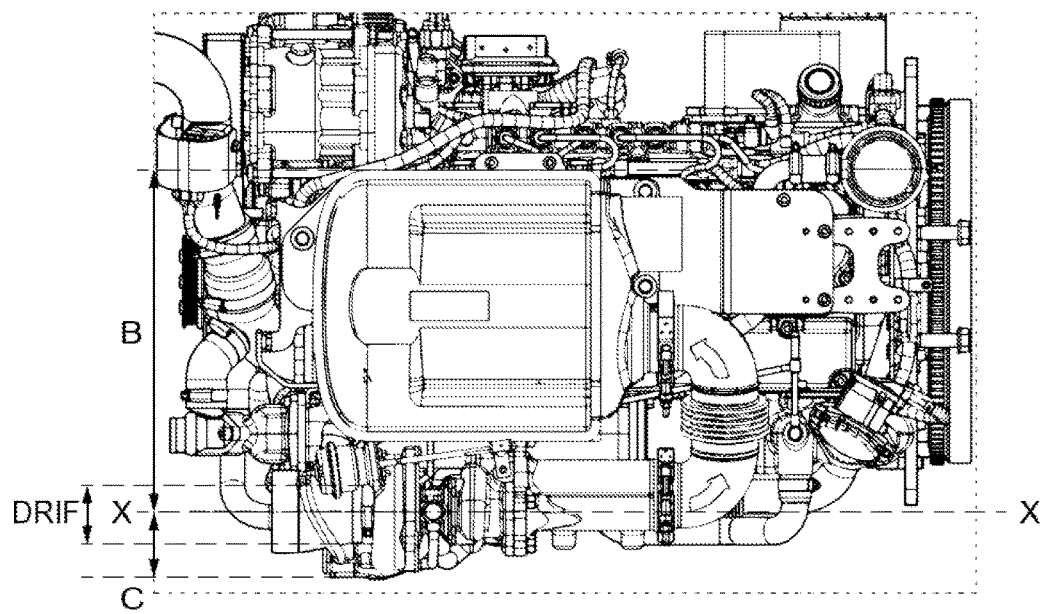

FIG. 10 is a partial view from above of the internal combustion engine of FIG. 8.

Figure 1:
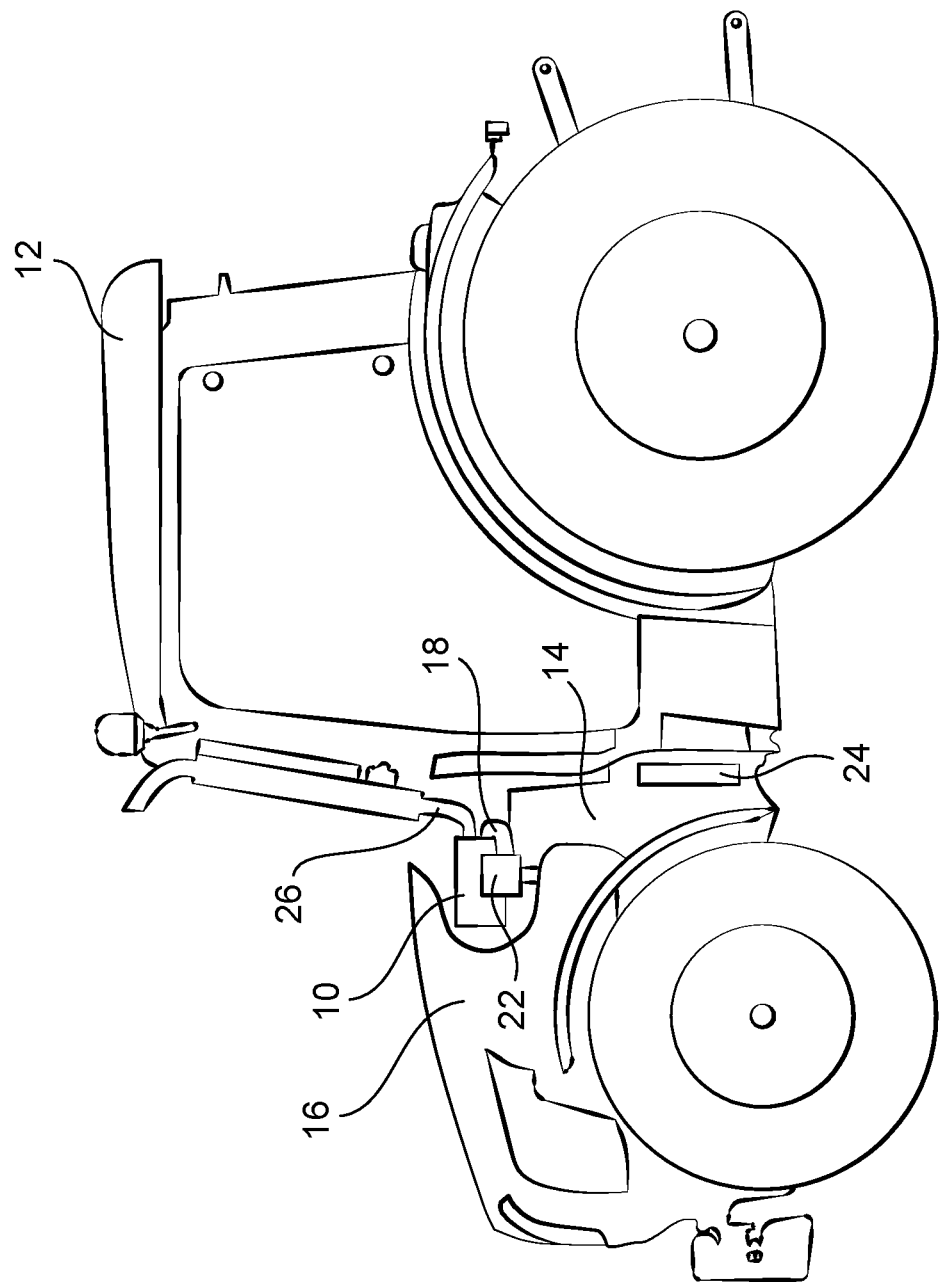
FIG. 1 shows a generic farming tractor on which a system for treating exhaust gases according to the present invention is installed.

With reference to the figures, a system for treating exhaust gases according to the present invention is shown, wholly indicated with reference numeral 10. The system 10 for treating exhaust gases is configured to be mounted on a vehicle 12 consisting of a generic farming or industrial tractor provided with an internal combustion engine 14 of the diesel cycle type and with a forced induction group with turbocompressor. The engine 14 is enclosed by a hood 16, a part of which has been cut out in FIG. 1 for the sake of clarity.

The system 10 for treating exhaust gases is provided with a conduit 18 for the inlet of exhaust gases, operatively connected to the exit door of the turbine 22 of the engine 14. The turbine 22 is placed on the same side as the fly-wheel 24 of the engine 14. The system 10 for treating exhaust gases is also provided with a conduit 20 for the outlet of exhaust gases (FIG. 3), operatively connected to the piping 26 that contains the silencer and that discharges the treated smoke towards the outside.

Figure 2:
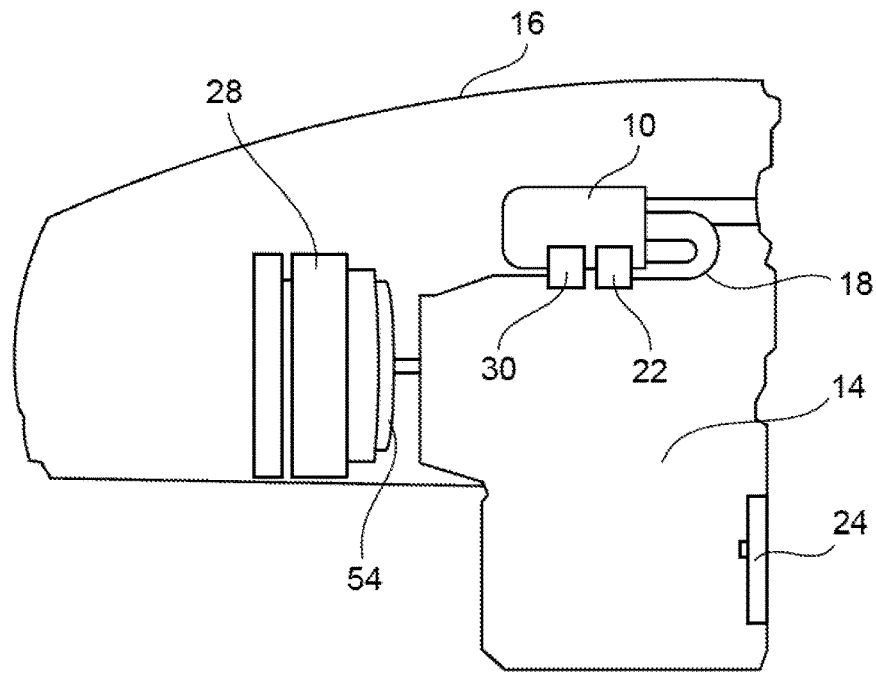
FIG. 2 is a schematic side view of the engine compartment of the farming tractor of FIG. 1, in which the arrangement of the system for treating exhaust gases according to the present invention is illustrated.

With reference to FIG. 2, which shows the engine compartment of the tractor 12, the arrangement of the components of the engine 14 is illustrated. The cooling system 28 of the tractor 12 is placed at the front part with respect to the engine 14 (on the left in FIG. 2), whereas the fly-wheel 24 is placed at the rear part with respect to the engine 14 (on the right side of FIG. 2). Above the engine 14, the forced induction group is housed, consisting of a compressor 30 and of the turbine 22. The exit door of such a turbine 22 is connected to the system 10 for treating the exhaust gases through the conduit 18 for the inlet of exhaust gases, thermally insulated with respect to the engine 14. The compressor 30 is installed upstream of the turbine 22 so as to avoid, considering the flow of air discharged by the fan 54 of the tractor 12, a further increase of its temperature, as well as of the temperature of the air that passes through it.

Figure 3:
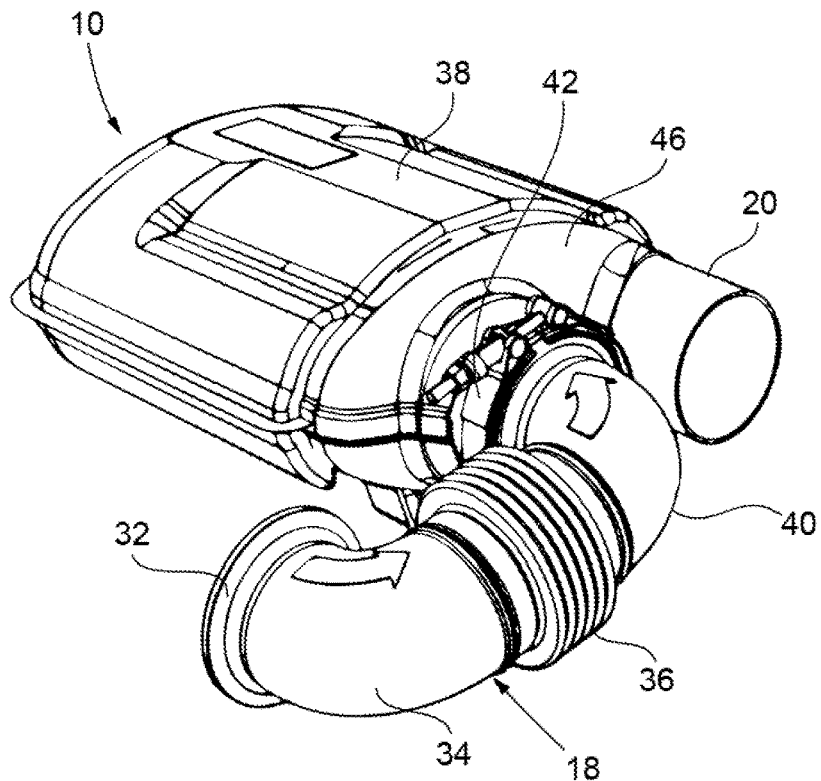
FIG. 3 is a perspective view of the system for treating exhaust gases according to the present invention.

FIG. 3 illustrates the system 10 for treating exhaust gases according to the present invention. The conduit 18 for the inlet of exhaust gases, thermally insulated with respect to the engine 14, consists in sequence of a flange 32 for coupling to the exit door of the turbine 22, a first pipe 34 with a 90° elbow curve, a flexible element 36, configured for absorbing the heat dilations and mechanical vibrations, and a second pipe 40 with a 90° elbow curve, which allows the removable coupling of the conduit 18 for the inlet of exhaust gases with the main body or shell 38 of the system 10 for treating the exhaust gases. Based on this configuration the conduit 18 for the inlet of exhaust gases assumes a substantially U shape and is able to deviate the flow of such exhaust gases by about 180°.

The conduit 18 for the inlet of exhaust gases and the conduit 20 for the outlet of exhaust gases are placed in fluid communication with a same transverse side wall 46, with respect to the driving direction of the vehicle 12, of the main body or shell 38 of the system 10 for treating exhaust gases. In detail, formed on such a transverse side wall 46 of the main body or shell 38 are an inlet fitting 62, able to be connected to the second pipe 40 with a 90° elbow curve of the conduit 18 for the inlet of exhaust gases through a coupling device 42 of the "V-clamp" type, as well as the conduit 20 for the outlet of exhaust gases, able to be connected to the exhaust piping 26 of the engine 14 through known coupling means. The main body or shell 38 of the system 10 for treating the exhaust gases is internally hollow to contain the substrate 44 (catalyst or filter, FIG. 7) through which the exhaust gases are conveyed, as will be specified in greater detail hereafter.

Figure 4:
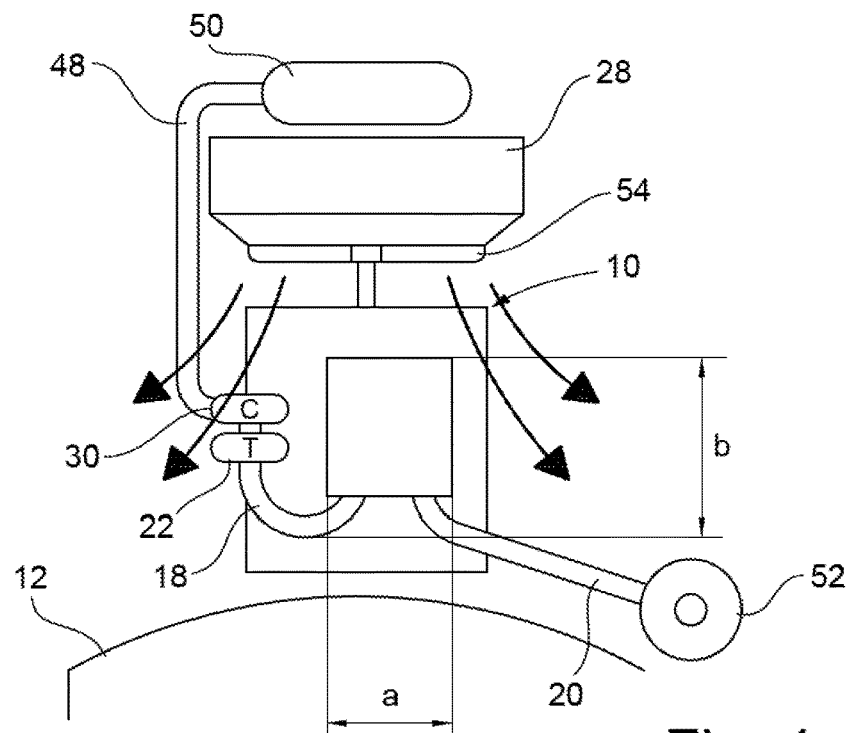
FIG. 4 shows the layout of the system for treating exhaust gases according to the present invention.

FIG. 4 schematically shows the arrangement of the components of the system 10 for treating the exhaust gases according to the present invention with respect to the components of the engine 14. This arrangement can be compared with the known solutions of FIG. 5 and FIG. 6. The forced induction system, consisting of the compressor 30 and the turbine 22, is arranged with the compressor 30 on the side of the cooling system 28 in FIG. 4 and in FIG. 5, and on the side of the fly-wheel 24 in FIG. 6. The air intake conduit 48 of the engine 14 connects the air filter 50 with the compressor 30.

The system 10 for treating exhaust gases is connected to the exit door of the turbine 22 through the conduit 18 for the inlet of exhaust gases. The system 10 for treating exhaust gases is also connected to the exhaust piping 26, or to a further system 52 for the treatment of exhaust gases, through the conduit 20 for the outlet of exhaust gases. It should be noted that in the configuration according to the present invention (FIG. 4) there is an improvement in terms of transverse overall dimension (width a) and longitudinal dimension (length b) of the system 10 for treating exhaust gases with respect to known configurations (FIGS. 5 and 6).

The system 10 for treating exhaust gases according to the present invention makes it possible to simultaneously obtain a shorter length of the air intake conduit 48 of the engine 14, of the conduit 18 for the inlet of exhaust gases, which connects the turbine 22 with the system 10 for treating exhaust gases, and of the exhaust piping 26, ensuring the following advantages:

a reduced load loss in the air intake conduit 48 and in the exhaust piping 26 and therefore better performance of the engine 14 during the transient work cycle;

the shorter length of the air intake conduit 48 allows a reduction of the heat transferred from the hot air, discharged by the fan 54, to the cool air contained inside the air intake conduit 48 itself;

the shorter length of the exhaust piping 26 allows a reduction of the heat transferred from the exhaust gases, contained in the exhaust piping 26 itself, to the outside. The higher the temperature of the exhaust gases, the better the efficiency of the system 10 for treating exhaust gases.

FIG. 7 is a section view of the system 10 for treating exhaust gases according to the present invention. The fumes exiting from the conduit 18 for the inlet of exhaust gases are expanded and slowed down in a divergent conduit 56 enclosed by the main body or shell 38 and arranged between such a conduit 18 for the inlet of exhaust gases and the substrate 44, thus coming into contact with the substrate 44 itself. The residency time of the exhaust gases inside the substrate 44 must be sufficient to complete the chemical reactions.

Once the substrate 44 has been passed, the fumes undergo a deviation of 180° towards the conduit 20 for the outlet of exhaust gases by an end wall 58 of the main body or shell 38 opposite with respect to the transverse side wall 46 on which both the inlet conduit 18, and the conduit 20 for the outlet of exhaust gases are formed. The flow is indicated by the arrows present in FIG. 7.

The fumes lap the outer walls of the main body or shell 38 with the purpose of keeping the temperature of the substrate 44 as much as possible at a constant value and of helping the heating step of the system 10 for treating exhaust gases, reducing the time needed to reach the activation temperature of the catalyst. The outer surface of the main body or shell 38 is thus at least partially coated with a layer 60 of heat insulating material, which also covers the end wall 58 for deviating the exhaust gases.

FIG. 8 shows the arrangement of the system 10 for treating the exhaust gases according to the present invention on the head of the engine 14. In FIG. 8 it can also be seen how the main body or shell 38 of the system 10 for treating exhaust gases has a cross-sectional shape, with respect to the driving direction of the vehicle 12, of an ellipsoid the larger axis of which is oriented according to a substantially horizontal direction and the smaller axis of which is oriented according to a substantially vertical direction. In other words, the main body or shell 38 of the system 10 for treating exhaust gases has a widened and compressed shape, with oval or ellipsoidal cross section, which allows it to occupy the least possible height-wise space on the head of the engine 14.

In detail, with reference to FIGS. 9 and 10, $D_{RIF}$ indicates the diameter of the inlet door of the compressor 30, whereas X indicates a longitudinal reference axis passing through the centre of the inlet door of the compressor 30. With respect to the diameter $D_{RIF}$ and to the longitudinal reference axis X, the main overall dimensions of the system 10 for treating exhaust gases are as follows:

$$A \leq 1,3 \times D_{RIF} \; B \leq 5 \times D_{RIF} \; C \leq 1,2 \times D_{RIF}$$

where:
A=maximum overall height of the system 10 for treating exhaust gases;
B=transverse overall dimension of the system 10 for treating exhaust gases on the right side with respect to the longitudinal reference axis X;
C=transverse overall dimension of the system 10 for treating exhaust gases on the left side with respect to the longitudinal reference axis X.

It has thus been seen that the system for treating exhaust gases for a vehicle equipped with internal combustion engine according to the present invention achieves the purposes outlined earlier.

The system for treating exhaust gases for a vehicle equipped with internal combustion engine of the present invention thus conceived can in any case undergo numerous modifications and variants, all of which are covered by the same inventive concept; moreover, all of the details can be replaced with technically equivalent elements. In practice, the materials used, as well as the shapes and sizes, can be whatever according to the technical requirements.

The scope of protection of the invention is therefore defined by the attached claims.

The invention claimed is:

1. Vehicle (12) in combination with an internal combustion engine (14), the internal combustion engine (14) comprising:
   a fly-wheel (24) placed at a rear part with respect to the internal combustion engine (14);
   a cooling system (28) placed at a front part with respect to the internal combustion engine;
   a forced induction group consisting of a turbine (22), placed on the same side of the fly-wheel (24), and of a compressor (30), placed on the same side of the cooling system (28); and
   a system (10) for treating exhaust gases provided with a conduit (18) for the inlet of exhaust gases, operatively connected to an exit door of the turbine (22), a conduit (20) for the outlet of exhaust gases and a main body or shell (38) internally hollow for containing a substrate (44) through which the exhaust gases are conveyed so that they are subject to predefined chemical reactions, wherein said system (10) for treating exhaust gases is placed on a head of the internal combustion engine (14), wherein said main body or shell (38) has a cross-sectional shape, with respect to the driving direction of the vehicle (12), an ellipsoid the larger axis of which is oriented according to a substantially horizontal direction and the smaller axis of which is oriented according to a substantially vertical direction, so that said main body or shell (38) has a widened and compressed shape that allows it to occupy the least heightwise possible space with respect to the head of the internal combustion engine (14), and wherein said conduit (18) for the inlet of exhaust gases and said conduit (20) for the outlet of exhaust gases are placed in fluid communication with a same transverse side wall (46), with respect to the driving direction of the vehicle (12), of said main body or shell (38).

2. Vehicle (12) in combination with an internal combustion engine (14) according to claim 1, wherein, with respect to the diameter ($D_{RIF}$) of the compressor inlet door (30) and with respect to a longitudinal reference axis (X) passing through the centre of the compressor inlet door (30), the maximum overall height-wise A of the system (10) for treating the exhaust gases, the transverse overall dimension B of said system (10) for treating the exhaust gases on the right side with respect to the longitudinal reference axis (X) and the transverse overall dimension of said system (10) for treating the exhaust gases on the left side with respect to the longitudinal reference axis (X) are equivalent to:

$$A \leq 1,3 \times D_{RIF}; B \leq 5 \times D_{RIF}; C \leq 1,2 \times D_{RIF}.$$

3. Vehicle (12) in combination with an internal combustion engine (14) according to claim 1, wherein the conduit (18) for the inlet of exhaust gases is heat insulated with respect to the internal combustion engine (14).

4. Vehicle (12) in combination with an internal combustion engine (14) according to claim 1, wherein the conduit (18) for the inlet of exhaust gases consists in sequence of a flange (32) for coupling to the outlet door of the turbine (22), of a first pipe (34) with a 90° elbow curve, of a flexible element (36), configured for absorbing the heat dilations and mechanical vibrations, and of a second pipe (40) with a 90° elbow curve, which allows the removable coupling of said conduit (18) for the inlet of exhaust gases with the main body or shell (38) of the system (10) for treating the exhaust gases, so that said conduit (18) for the inlet of exhaust gases assumes a substantially U-shape and is capable of diverting by about 180° the flow of said exhaust gases.

5. Vehicle (12) in combination with an internal combustion engine (14) according to claim 4, wherein on the transverse side wall (46) of the main body or shell (38) an inlet fitting (62), which can be connected to the conduit (18) for the inlet of exhaust gases, as well as the conduit (20) for the outlet of exhaust gases, which can be connected to an exhaust piping (26) of the internal combustion engine (14) or a further system (52) for the treatment of exhaust gases are obtained.

6. Vehicle (12) in combination with an internal combustion engine (14) according to claim 5, wherein the inlet fitting (62) is connected to the second pipe (40) with a 90° elbow curve of the conduit (18) for the inlet of exhaust gases through a coupling device (42) of the "V-clamp" type.

7. Vehicle (12) in combination with an internal combustion engine (14) according to claim 1, wherein the main body or shell (38) encloses a divergent conduit (56) interposed between the conduit (18) for the inlet of exhaust gases and the substrate (44), so that the exhaust gases exiting from said conduit (18) for the inlet of exhaust gases are expanded and slowed in said divergent conduit (56) and so that the time the exhaust gases remain within the substrate (44) is sufficient for completing the chemical reactions.

8. Vehicle (12) in combination with an internal combustion engine (14) according to claim 1, wherein the main body or shell (38) is provided with an end wall (58), opposite with respect to the transverse side wall (46), capable of diverting by 180°, towards the conduit (20) for the outlet of exhaust gases, the exhaust gases exiting from the substrate (44), so that said exhaust gases lap the side walls of the main body or shell (38) with the aim of maintaining the temperature of the substrate (44) at a constant value as much as possible and of facilitating the heating step of the system (10) for treating the exhaust gases.

9. A Vehicle (12) in combination with an internal combustion engine (14) according to claim 8, wherein the outer surface of the main body or shell (38) is at least partially coated with a layer (60) made of heat insulating material, which also covers the end wall (58) for diverting the exhaust gases.

10. Vehicle (12) in combination with an internal combustion engine (14) according to claim 1, wherein the compressor (30) is installed upstream of the turbine (22) so as to avoid, considering the flow of air discharged by the cooling system (28), a further increase of the temperature of said compressor (30), as well as the temperature of the air which passes through said compressor (30).

11. Vehicle (12) in combination with an internal combustion engine (14) according to claim 1, wherein the system (10) for the treatment of exhaust gases is provided with a substrate (44) selected from the group consisting of:
- a catalyst device of the DOC (Diesel Oxidation Catalyst) type;
- a catalyst device of the DOC+POC (Particulate Oxidation Catalyst) type; and
- a filter of the DPF (Diesel Particulate Filter) type.

* * * * *

UNITED STATES PATENT AND TRADEMARK OFFICE
CERTIFICATE OF CORRECTION

PATENT NO. : 10,113,466 B2
APPLICATION NO. : 15/310088
DATED : October 30, 2018
INVENTOR(S) : Manilo Mattei, Luca Crippa and Antonio Diego Mazzotti Page 1 of 1

It is certified that error appears in the above-identified patent and that said Letters Patent is hereby corrected as shown below:

On the Title Page

The name of the Assignee reading "SDF S.p.A." should read --SAME DEUTZ-FAHR ITALIA S.p.A.--.

Signed and Sealed this
Twelfth Day of February, 2019

Andrei Iancu
*Director of the United States Patent and Trademark Office*